United States Patent [19]

Bennett

(10) Patent No.: US 11,804,733 B2
(45) Date of Patent: Oct. 31, 2023

(54) INTEGRATED WIRELESS RESONANT POWER CHARGING AND COMMUNICATION CHANNEL

(71) Applicant: Avago Technologies International Sales Pte. Limited, Singapore (SG)

(72) Inventor: James D. Bennett, Hroznetin (CZ)

(73) Assignee: Avago Technologies International Sales Pte. Limited, Singapore (SG)

( * ) Notice: Subject to any disclaimer, the term of this patent is extended or adjusted under 35 U.S.C. 154(b) by 530 days.

(21) Appl. No.: 16/586,109

(22) Filed: Sep. 27, 2019

(65) Prior Publication Data

US 2020/0028383 A1    Jan. 23, 2020

Related U.S. Application Data

(63) Continuation of application No. 14/982,761, filed on Dec. 29, 2015, now Pat. No. 10,483,801, which is a
(Continued)

(51) Int. Cl.
*H02J 50/12*    (2016.01)
*G06Q 50/06*    (2012.01)
(Continued)

(52) U.S. Cl.
CPC .......... *H02J 50/12* (2016.02); *G06Q 20/3674* (2013.01); *G06Q 50/06* (2013.01);
(Continued)

(58) Field of Classification Search
CPC ..... H02J 50/12; H04B 5/0031; H04B 5/0037; H04B 5/0081
(Continued)

(56) References Cited

U.S. PATENT DOCUMENTS 5,455,466  A    10/1995  Parks et al.
7,936,095  B2*  5/2011  Kawabata  ............... H02J 50/90
                                                       307/326
(Continued)

FOREIGN PATENT DOCUMENTS

EP          1734635          * 12/2006
WO    WO-2007/008646 A2       1/2007

OTHER PUBLICATIONS

Extended European Search Report on EP 19163722.2 dated Oct. 25, 2019 (11 pages).

*Primary Examiner* — Nathaniel R Pelton
(74) *Attorney, Agent, or Firm* — Foley & Lardner LLP

(57) ABSTRACT

A wireless powering device for providing directional wireless power to a target device. The wireless powering device includes a power source and communication circuitry configured to receive a communication signal from the target device. The wireless powering device further includes source power manager circuitry configured to determine (e.g., based on the communication signal) a location of the target device relative to the wireless powering device. Resonant coupling circuitry is coupled to the power source and the source power manager circuitry, the resonant coupling circuitry configured to generate a directional wireless power transmission, based on the location of the target device, to transfer wireless power to the target device. In an embodiment, the directional wireless power transmission is via non-radiated magnetic field. In another embodiment, the direction wireless power transmission is via a radiated magnetic field.

20 Claims, 11 Drawing Sheets

Related U.S. Application Data continuation of application No. 13/367,161, filed on Feb. 6, 2012, now abandoned, which is a continuation of application No. 12/241,245, filed on Sep. 30, 2008, now Pat. No. 8,111,042.

(60) Provisional application No. 61/086,380, filed on Aug. 5, 2008.

(51) Int. Cl.
| | | |
|---|---|---|
| *G06Q 20/36* | (2012.01) | |
| *H04B 5/00* | (2006.01) | |
| *H02J 50/80* | (2016.01) | |
| *H02J 7/00* | (2006.01) | |

(52) U.S. Cl.
CPC ............ *H02J 50/80* (2016.02); *H04B 5/0031* (2013.01); *H04B 5/0037* (2013.01); *H04B 5/0081* (2013.01); *H02J 7/007* (2013.01); *H02J 7/00034* (2020.01); *H02J 7/00036* (2020.01); *H02J 7/00045* (2020.01); *H02J 7/00047* (2020.01); *Y04S 50/12* (2013.01)

(58) Field of Classification Search
USPC .................................................. 320/106, 108
See application file for complete search history.

(56) References Cited

U.S. PATENT DOCUMENTS

| | | | |
|---|---|---|---|
| 9,130,602 B2 * | 9/2015 | Cook | H02J 50/20 |
| 2004/0130915 A1 | 7/2004 | Baarman | |
| 2004/0145342 A1 | 7/2004 | Lyon | |
| 2005/0119716 A1 * | 6/2005 | McClure | A61N 1/3727 |
| | | | 607/33 |
| 2008/0238364 A1 * | 10/2008 | Weber | H02J 50/70 |
| | | | 320/108 |
| 2008/0278264 A1 * | 11/2008 | Karalis | H04B 5/0037 |
| | | | 307/104 |
| 2009/0243394 A1 * | 10/2009 | Levine | H02J 5/005 |
| | | | 307/104 |

* cited by examiner

INTEGRATED WIRELESS RESONANT POWER CHARGING AND COMMUNICATION CHANNEL

CROSS REFERENCE TO RELATED APPLICATIONS

The present U.S. Utility Patent Application claims priority pursuant to 35 U.S.C. § 120 as a continuation of U.S. Utility application Ser. No. 14/982,761, entitled "INTEGRATED WIRELESS RESONANT POWER CHARGING AND COMMUNICATION CHANNEL", filed Dec. 29, 2015, which is a continuation of U.S. Utility application Ser. No. 13/367,161, entitled "INTEGRATED WIRELESS RESONANT POWER CHARGING AND COMMUNICATION CHANNEL", filed Feb. 6, 2012, which is a continuation of U.S. Utility application Ser. No. 12/241,245, entitled "INTEGRATED WIRELESS RESONANT POWER CHARGING AND COMMUNICATION CHANNEL", filed Sep. 30, 2008, issued as U.S. Pat. No. 8,111,042 on Feb. 7, 2012, which claims priority pursuant to 35 U.S.C. § 119(e) to U.S. Provisional Application No. 61/086,380, entitled "INTEGRATED RESONANT POWER CHARGING AND COMMUNICATION CHANNEL", filed Aug. 5, 2008, all of which are hereby incorporated herein by reference in their entirety and made part of the present U.S. Utility Patent Application for all purposes.

BACKGROUND

1. Technical Field

The present invention relates generally to the wireless charging of a battery powered device; and more particularly to techniques for near field wireless resonance power delivery to a target device.

2. Related Art

All electronic devices require electrical power to operate. Mobile devices such as laptop computers and cell phones typically include a rechargeable battery that is recharged when the device is plugged into a power socket. Rechargeable batteries must be charged from wall power regularly to maintain battery life because rechargeable batteries discharge even when not used. The users of the mobile devices often suffer due to inaccessibility of electrical power for battery charging. In such a situation, the user must carry multiple batteries for continued operation of the mobile device. Requiring a user to carry backup batteries not only incurs the expense of the additional battery but requires transport space and increased transport expense.

Users of mobile devices usually carry power cables so that they can recharge the batteries of their mobile devices. These power cables are often misplaced or lost, inconveniencing the users. Quite often, the power cables are device specific and cannot be used in place of one another. Further, even with a power cable in hand, power sockets may be unavailable. This problem is a particular issue in airports or other public places, which users of the mobile devices frequent. In some critical applications, such as military applications and medical applications, it becomes dangerous if not disastrous to interfere with an ongoing activity/communication of a mobile device simply to recharge the device's battery.

Near field power delivery has been known for many years. Nikola Tesla first experimented with such power delivery many years ago, although his solutions were not viable for various reasons. Near field power delivery typically exploits magnetically coupled resonance, which allows two objects resonating at the same frequency to exchange energy with moderate efficiency. The frequency of such near field resonance may be much lower than wireless communication frequencies, e.g., 10 MHz for near field resonances compared to 2 GHz for wireless communications. Thus, near field power delivery shows much promise, although it is not yet commercially exploited.

Further limitations and disadvantages of conventional and traditional approaches will become apparent to one of ordinary skill in the art through comparison of such systems with the present invention.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
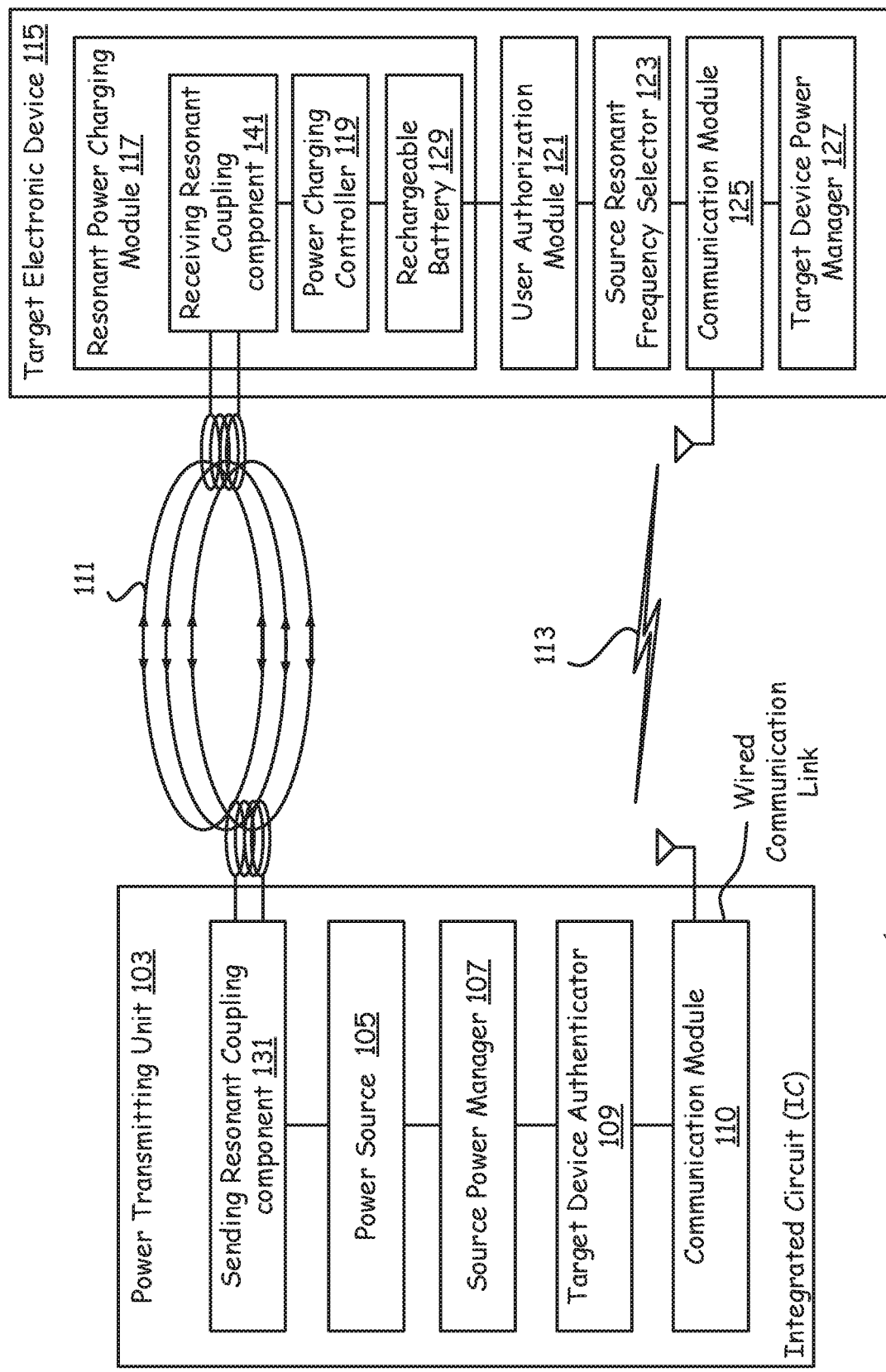
FIG. 1 is a block diagram illustrating a wireless power delivery system that includes a power transmitting unit and a target electronic device, wherein power is delivered wirelessly employing magnetic waves.

As a portability requirement, most portable electronic devices operate on power supplied by a coupled battery supply. The amount of power drawn by the electronic circuits in these devices determines battery life. This imposes an immediate limitation on the usage of these devices, that of recharging the batteries often to keep the devices in operational conditions. For the operational continuity of these devices, users often carry additional batteries. The battery recharging operation is typically dependent on the availability of the electric supply, and to the availability of compatible power sockets. Embodiments of the present invention remove these dependencies and inconveniences by providing new wireless means to charge batteries. For example, it provides a power transmitting unit that employs magnetic resonant means and/or other near field power delivery techniques, such as non-radiated magnetic field waves of a target resonant frequency, to power remote devices that are in proximity and capable of receiving power transmitted as non-radiated magnetic fields. Embodiments of the present invention provides for automatic initiation of battery recharge operations, wherein recharge can occur without interruption to current operations being conducted on the remote devices. Operationally uninterrupted in-situ charging of the batteries is an elegant solution irrespective the availability of the conventional electricity.

Embodiments of the present invention address battery power charging in-situ from a remote power source (station) wirelessly using radiated magnetic power or non-radiated magnetic fields. This approach of recharging a battery in remote devices is applicable to fairly long distance between a power source and a target device i.e. the gadget having rechargeable battery in it. In some embodiments of the present invention the delivery of power is conducted through high frequency resonant magnetic coupling between a power source and a target device, the target device being an electronic device that runs on a portable rechargeable battery embedded in it.

In typical embodiments of the present invention for wireless power transfer, the power source and the target device are tuned to the same frequency. This results in magnetic resonance in the target device for power transmitted by the power source, with air as the medium for power transfer.

In accordance with one embodiment of the present invention, the magnetic coupling between a power transmitting unit and a target device enables the power transfer. A magnetic field is directed towards the target device by properly shaping the magnetic generating coil. This system works on the transformer principle but with air core and across a greater distance. Also in this setup the power transfer is relatively significant compared to the resonant power transfer using RF electromagnetic signals due relatively close proximity of the power source with the target device and the use of a common frequency between the power transmitting unit and a target device. For example, the system of the present invention may use one or more coils disposed in a floor or ceiling of a room with target devices within the room receiving power. However, coils of the present invention could be disposed in a structure such as a kiosk in a shopping mall or airport, with an operator of the kiosk charging target devices for being charged at the kiosk. Various other installations of the device may be employed according to the teachings described herein.

Magnetic signals/fields created by the power source are received by an antenna/coil of the target device. The received signals/fields charge capacitors through diodes at the target device. An array of such capacitors may be connected in series using a plurality of diodes. This array of capacitors and plurality of diodes helps in rectification of AC (alternating current) to DC (direct current) and may amplify the DC voltage to a value that is sufficient to charge a battery in the target device.

A power/voltage sensing mechanism of the target device helps to control the power/voltage of the signal used to charge the battery, in accordance with the present invention. A low voltage limit/low power level sensing circuitry in the target device initiates a power request to the power transmitting unit (sometimes referred to as a wireless power station). A high voltage limit/high power level sensing circuit senses the maximum allowable battery voltage or power level during charging. Once the battery is charged to a maximum level, the high voltage sensing circuitry initiates a termination of power delivery, such as by communicating a request for the power transmitting unit (power station) to cutoff the power, by terminating the wireless transmission of magnetic fields (radiated or non-radiated, as the case may be)/magnetic resonant power transmissions.

An authorization module of the target device initiates authentication of the target device to receive resonant power from the power transmitting unit. For example, such authentication is done based on the information that the authorization module shares with the power transmitting unit. Specifically, in one embodiment, the authentication is conducted based on the comparison of authentication information sent by the authorization module with other information available in an authentication database in the power transmitting unit.

According to an aspect of the present invention, the resonant power wireless transmission supports communications at least from the power transmitting unit and the target device. These communications may include information relating to the power charging or other information. Because of the strong wireless coupling between the power transmitting unit and the target device, high data rate communications may be supported by using this technique. For communications from the target device to the power transmitting unit, the same principle may be employed. However, in some embodiments, communications from the target device to the power transmitting unit may be supported by other wireless techniques such as Wireless Local Area Network (WLAN) operations, e.g., IEEE 802.11x, Wireless Personal Area Network operations (WPAN) operations, e.g., Bluetooth, infrared communications, cellular communications and/or other techniques.

FIG. 1 is a block diagram illustrating a wireless power delivery system 101 that includes a power transmitting unit 103 and a target electronic device 115, wherein power is delivered wirelessly employing magnetic waves. The power delivery system 101 is used to deliver electric power to one or more target devices, and the target devices use the delivered power for operation or for recharging a battery or both. The power delivery system 101 includes the power transmitting unit 103, the target electronic device 115, and other target devices capable of receiving power being transmitted. The power transmitting unit 103 includes a power source 105 capable of generating power for power transmission and a sending resonant coupling component 131 capable of power transmission employing magnetic waves 111, such as a non-radiated magnetic field waves of a specified target resonant frequency. It also includes a source power manager 107 and a target device authenticator 109. The power transmitting unit 103 is capable of dynamically tuning the power transmission to the target resonant frequency associated with the target electronic device 115, wherein the target resonant frequency is specified dynamically. The power transmitting unit also includes a communication module 110 operable to send a communication signal to the target electronic device 115 via the magnetic waves 111 and/or via Radio Frequency (RF) communications 113. The RF communications 113 may include Wireless Local Area Network (WLAN) communications such as IEEE 802.11x communications, Wireless Personal Area Network (WPAN) communications such as Bluetooth communications, cellular communications, proprietary interface communications, or other RF communication techniques. The communication module 110 may also include a wired communication link, e.g., Local Area Network (LAN) such as Ethernet, Cable Modem, Wide Area Network (WAN) and/or other wired communication means. For example, the wired communication link could provide a high speed uplink to the Internet.

The target electronic device 115 includes a resonant power charging module 117, a user authorization module 121, a source resonant frequency selector 123, a communication module 125, and a target device power manager 127. The resonant power charging module 117 includes a receiving resonant coupling component 141, a power charging controller 119, and a rechargeable battery 129. The receiving resonant coupling component 141, also sometimes referred to as a receiving resonant charging component, is used to receive the power transmissions provided by the power transmitting unit 103 employing the target resonant frequency. The target electronic device 115 employs the received power for operation of the target electronic device 115 as well as for charging the rechargeable battery 129 in the target electronic device 115. The power delivery system 101 employs the sending resonant coupling component 131 of the power transmitting unit 103 to generate magnetic fields that are used to transmit power to the target devices, such as the target electronic device 115. Typically, the sending resonant coupling component 131 includes a resonant coil that fills the space around it with a non-radiated magnetic field oscillating at the target resonant frequency that is received by the target electronic device 115 employing the receiving resonant coupling component 141. The target device also includes a communication module 125 operable to communicate with the communication module 110 of the power transmitting unit 103 via the magnetic coupling and/or via RF communications.

The power transmitting unit 103 that includes the power source 105 and the target electronic device 115 are communicatively coupled with each other during the resonant power delivery from the power source 105 to the target electronic device 115. The resonant coupling is achieved wirelessly using a 'wireless field' 111, which is a non-radiated magnetic field in some embodiments. The 'wireless field' 111 is the power delivery channel and a 'wireless link' 113 is the control signal channel. In one embodiment of the present invention communicating the power and a control signal are conducted employing the same frequency, or in other words, on the same channel, i.e. the wireless field 111. In another embodiment the power link (such as the magnetic field), the control signal, and the normal communication (i.e. the normal function) operation takes place in separate channels. For e.g. the power transmitting unit 103 is implemented in the base station of a mobile phone, where the normal communication operations with the mobile phone (from the base station), resonant power delivery, and the control signal transmission are all conducted between the mobile phone (as a target electronic device) and the base station employing different channels.

The power source 105 is a module which generates the required power to be transmitted in a non-radiated magnetic or radiated magnetic mode, employing an essentially 'wireless means' 111. The power source 105 provides power to the sending resonant coupling component 131 which transmits it, for example, creating a non-radiated magnetic field. A source power manager 107 manages the wireless power transmission.

In one embodiment, the power source 105 generates an alternating current signal that is sufficiently power amplified and radiated using a highly directional antenna in the direction of the target device 115. In a different embodiment, the required directionality for the power transmitted is achieved using an antenna array or a dish antenna, as appropriate.

The resonant power charging module 117 of the target electronic device 115 includes the receiving resonant coupling component 141 that is capable of receiving the transmitted power. In one embodiment, receiving resonant coupling component 141 includes a resonating coil and associated tuning elements such as capacitors.

Isolation of the resonating circuitry of the receiving resonant coupling component 141 from other internal circuitry of the target electronic device 115 is supported, such as by the use of a buffer (isolation) amplifier, a diode, and capacitor voltage multiplier. In a related embodiment, the diode and the capacitor voltage multiplier are part of the resonating (antenna) circuitry of the receiving resonant coupling component 141. The required high quality factor and the resonant effect are achieved through the right choice of the diode, the capacitors, etc.

In one embodiment, voltage multipliers in the resonant power charging module 117 builds up the required voltage across a capacitor array to achieve the recharging of the rechargeable battery 129 of the target electronic device 115. During the process of power charging the power charging controller 119 regulates the electric charge that flows into the rechargeable battery 129. The power charging controller 119 of the resonant power charging module 117 senses the battery voltage for its high voltage limit or the low voltage limits to stop charging or start charging, respectively. The high voltage limit protects the battery and the low voltage limit initiates a resonant power request that results in the subsequent battery charging operation.

The user authorization module 121 facilitates the authentication of the target electronic device 115, for resonant power delivery, with the target device authenticator 109 of the power transmitting unit 103. During resonant power delivery the user authorization module 121 exchanges the authentication information with the power transmitting unit 103. The power transmitting unit 103 compares the information (or a computed value thereof) with the subscriber's information in its database accessed by the target device authenticator 109. If the match is determined, then resonant power delivery is initiated. The authentication is followed by optional frequency selection and directional adjustments of a non-radiated magnetic field in the direction of the target electronic device 115. In a related embodiment, the magnetic field steering is done based on the analysis of the determined or perceived location (e.g., employing arrival direction) of the target electronic device 115.

The source resonant frequency selector 123 provides a tuning mechanism in order to achieve the required resonant coupling effect. For example, it facilitates the tuning of capacitors where capacitors are used for tuning. Some tuning capacitors are voltage controlled, and they are basically, diode varactors. The tuning voltage is automatically adjusted to achieve the optimum reception from an antenna/resonant coupling mechanism such as coils.

The communicating module 125 facilitates the normal communication functionality of the target electronic device 115. It consumes the battery power when powered using the rechargeable battery 129. The power control communication that takes place between the target electronic device 115 and the power transmitting unit 103 during the resonant charging request, etc. is also performed using the communication module 125. A power control signal exchange operation is required for the authentication of the target electronic device 115 before a successful resonant power delivery. The target device power manager 127 manages the battery level of the rechargeable battery 129 by regulating the battery discharge and by initiating resonant power charge operation. For example, it monitors the battery level of the rechargeable battery 129 and initiates its recharge employing power delivered via resonant magnetic field.

In general, the battery charge (power in the battery) of the rechargeable battery 129 has to be replenished before the battery voltage falls below a threshold limit or before its power level falls below an acceptable level. If the battery voltage falls below a threshold limit, the critical part of the target electronic device 115 is likely to lose power supply, because the battery fails to operate. This situation is avoided with constant monitoring of battery levels and automatic triggering of recharge operations. Thus battery recharging and voltage restoration is automated and does not require any human intervention charge the rechargeable battery 129. The target device power manager 127 facilitates battery level monitoring and automatic recharge triggering.

The target device power manager 127 tracks the total charging time, amount of charge delivered, etc. The amount of charge acquired by the rechargeable battery 129 is communicated to the power transmitting unit 103. The source power manager 107 conducts similar monitoring function associated with power management from the power transmitting unit 103. The target device authenticator 109 authenticates the resonant power requests made by the target electronic device 115, and works in coordination with the user authorization module 121 of the target electronic device 115.

In one embodiment, a rechargeable electronic device, such as the target electronic device 115, typically includes the rechargeable battery 129. The rechargeable electronic device authenticates with the power transmitting unit 103 and receives a token that is used for subsequent communication and power charging (in one or more charging sessions). The rechargeable electronic device requests the power transmitting unit 103 for power, with the power to be transmitted employing non-radiated magnetic field waves of a target resonant frequency. The rechargeable electronic device 115 receives power transmitted over non-radiated magnetic field waves of the target resonant frequency from the power transmitting unit 103. It recharges the rechargeable battery 129 of the rechargeable electronic device 115.

According to various embodiments of the present invention, the power source 105 is operable to source alternating current power and the sending resonant coupling component 131 is operable to couple the alternating current power to a coil for wireless power transmission by a non-radiated magnetic field at a target resonant frequency. The power transmitting unit 103 is capable of dynamically tuning the wireless power transmission to the target resonant frequency wherein the target resonant frequency is specified dynamically. Further, the communication module 110 is operable to couple the communication signal to the non-radiated magnetic field 111.

In some operations, the sending resonant coupling component 131 forms the non-radiated magnetic field 111 substantially omni-directionally. Further, in other operations the communication module 110 is operable to communicate the target resonant frequency to the target device. The power transmitting unit 103 may adjust the target resonant frequency based upon feedback received from the target device 115 via the communication module 110.

The communication module 110 may communicate with the target device 115 in an RF spectrum via the communication module 125 of the target device 115. The communication module 110 may communicate the target resonant frequency to the target device via the RF interface. The RF interface may also be operable to receive data from the target device that includes at least one of a target device identity, target device billing information, target device power receipt level(s), and a target device battery charge state. The RF interface may be operable to receive a request for power delivery from the target device and also to receive authentication information from the target device. The power transmitting unit may be operable to select the target resonant frequency based upon the target device authentication information.

The power transmitting unit may also include a token generator that generates a token for delivery to the target device during a target device registration operation. The power transmitting unit is then operable to authenticate the target device during subsequent power transmission operations based partially on the token. The token generator may include a pseudorandom number generator operable to generate the token. With these operations, the power transmitting unit may be operable to deliver power to the target device only after authenticating the target device.

The target electronic device 115 having the rechargeable battery 129 may be operable to authenticate with the power transmitting unit 103 by receiving a token from the power transmitting unit, requesting power transmission by a non-radiated magnetic field from the power transmitting unit, receiving power non-radiated magnetic field at the target resonant frequency from the power transmitting unit and recharging the rechargeable battery 129. Recharging of the rechargeable battery 129 by the target electronic device 115 may include applying received power to a rechargeable battery, periodically sending a charging status to the power transmitting unit, monitoring the charging status until it exceeds a high charging limit, and communicating a request for termination of power delivery to the power transmitting unit when the high charging limit is reached. The token may be communicated to the power transmitting unit along with the request for power transmission with the token updated and stored when a new token is communicated by the power transmitting unit. The rechargeable electronic device may authenticate with the power transmitting unit employing a username and password.

Figure 2:
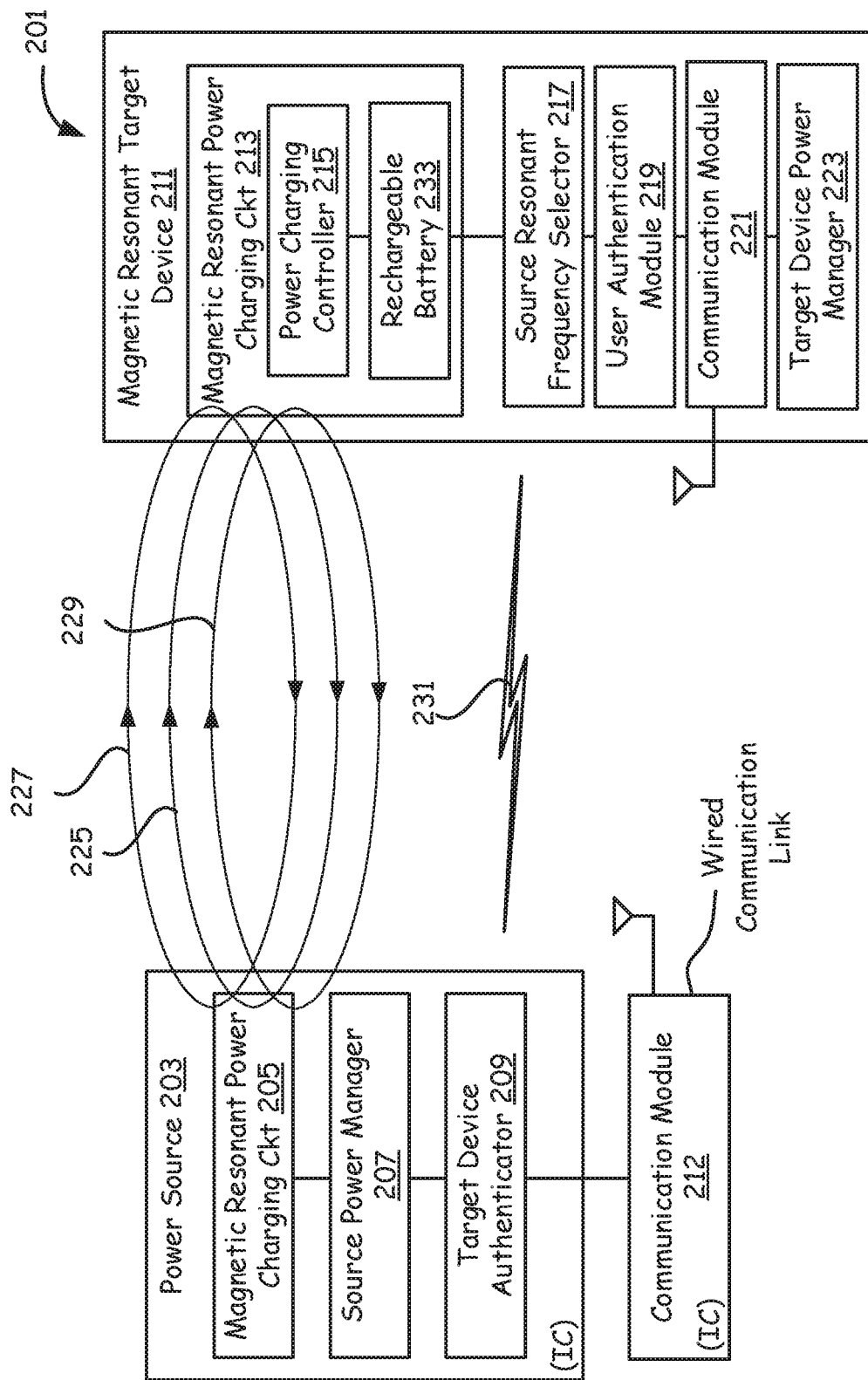
FIG. 2 is a block diagram illustrating a power transmitting network that employs resonant magnetic coupling for wireless power transfer from a power source to a magnetic resonant target device, in accordance with another embodiment of the present invention.

FIG. 2 is a block diagram illustrating a power transmitting network 201 that employs resonant magnetic coupling for wireless power transfer from a power source 203 to a magnetic resonant target device 211, in accordance with another embodiment of the present invention. The power source 203 includes a magnetic resonant power charging circuitry 205, a source power manger 207, and a target device authenticator 209. The magnetic resonant power charging circuitry 205 includes a magnetic field source (such as coupling circuitry) and power generator/amplifier to generate a magnetic field and to power amplify that field, respectively. The power amplified magnetic field is used to setup a magnetic field in air using a solenoid (or a coil) as indicated by a plurality of magnetic field lines 225, 227, and 229. These magnetic lines 225-229 are coupled with a magnetic resonant power charging module 213 of the magnetic resonant target device 211.

In one embodiment, a magnetic resonant power charging circuitry 213 converts the time varying magnetic flux linkages to the induced voltage across a resonating coil associated with a plurality of diodes, and a plurality of (special) capacitors. The voltage that is developed across the coil is rectified into DC form and stored in a special capacitor bank (array) resulting in voltage multiplier action. When the voltage across the voltage multiplier builds up gradually over several magnetic flux cycles to a required level, the rechargeable battery 233 starts charging. The power charging controller 215 controls the power charging operation of a rechargeable battery 233 in the magnetic resonant target device 211.

The power charging controller 215 senses the low voltage limit and high voltage limit of the rechargeable battery 233. When the voltage levels falls below the preset low voltage limit the power charging controller 215 issues a signal to the target device power manager 223. In response, the target device power manager 223 sends a power request to the power source 203. The power source 203 then sets up the necessary magnetic field/flux in the air for wireless power transmission. In the meantime, the magnetic resonant target device 211 starts receiving the electric power converted from the magnetic flux linkages received by a coil associated with the magnetic resonant power charging circuitry 213. In one embodiment, the received magnetic power is converted into induced electric power, and then to a DC power using a rectifier and capacitor array. The DC power is used to charge the 'rechargeable battery' 233 when the voltage across the capacitor array builds up to a battery charging limit.

The source power manager 207 ensures adequate magnetic power level required to setup magnetic flux. Also, it facilitates focusing magnetic flux lines 225-229 in one particular direction, if necessary, so that the magnetic resonant target device 211 will have an effective coupling with the power source 203.

The target device authenticator 209 receives the identity of the magnetic resonant target device 211 and verifies a user's authentication or user's subscription to a power charging service. The user authorization module 219 provides the identity information of the magnetic resonant target device 211 and information about a subscription if any (if necessary). The confirmation of the user's subscription is conducted by comparing information available with the target device authenticator 209 (or a database maintained or accessed by it) with the information provided by the user authorization module 219.

The target device power manager 223 initiates a power request using a wireless link 231 between the power source 203 and the magnetic resonant target device 211. The power charging controller 215 provides information periodically during the resonant power charging to the target device power manager 223. The target device power manager 223 communicates with the power source 203 during the resonant power charging activity so as to provide continued verification of access—the power source 203 can therefore eliminate/avoid unauthorized power access (by an unauthorized device).

The source resonant frequency selector 217 helps in making fine adjustments to the resonant operation, with synchronization to the incoming power signal frequency. This results in effective coupling between the power source 203 and the magnetic resonant target device 211 for an efficient resonant power transfer.

A user authorization module 219 delivers the identity of the magnetic resonant target device 211 to the power source 203, as necessary. The identity is sent on the 'wireless link' 231. This information is processed by the target device authenticator 209. On confirming the identity of the magnetic resonant target device 211 the power source 203 delivers the resonant power signal. In one embodiment, different frequencies are assigned to a plurality of the magnetic resonant target devices. The assigned frequency value is configured into the magnetic resonant target device 211. Sending of this information to power source 203 with a request for power helps in resonant locking/effective resonant coupling by the power source 203 with magnetic resonant target device 211.

The communication module 221 includes a circuit that sets up communication for the control operation between the magnetic resonant target device 211 and the power source 203. For example, it communicates with the power source 203 via its communication module 212 on the standard pre-assigned frequency using the wireless link 231.

Figure 3:
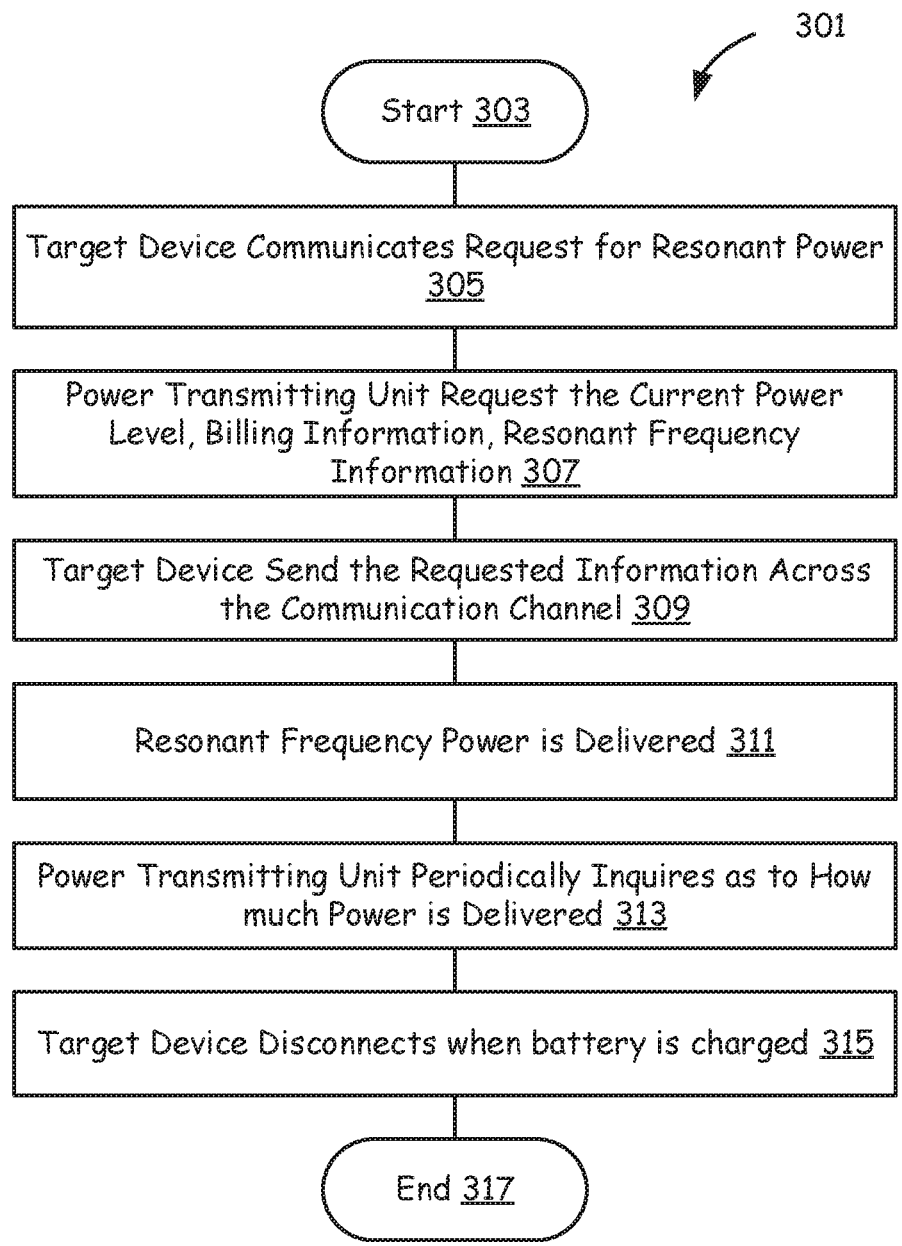
FIG. 3 is a flowchart illustrating resonant power transfer operation performed using the power system of FIG. 1 wherein a wireless power transmitting unit transmits power to the target electronic device in accordance with an embodiment of the present invention.

FIG. 3 is a flowchart illustrating resonant power transfer operations 301 performed using the power system of FIG. 1 wherein a wireless power transmitting unit 103 transmits power to the target electronic device 115 in accordance with an embodiment of the present invention. At a start block 303 the target electronic device 115 of FIG. 1 determines that power needs to be charged into the rechargeable battery 129. Then, at a next block 305, the target electronic device 115 communicates a request for resonant power signal to the power transmitting unit 103. During this step the target electronic device 115 sends its identity and its (tuned) resonant frequency information to the power transmitting unit 103. At a next block 307 the power transmitting unit 103 requests the current power level, billing information, etc. from the target electronic device 115.

In response to the request made at the block 307, the target electronic device 115 sends the requested information to the power transmitting unit 103 in the next block 309. The power transmitting unit 103 then generates power employing the requested resonant frequency and delivers it in the form of magnetic field/waves at the next block 311. In one embodiment, the magnetic field is in non-radiated mode, while in another, it is in radiated mode. The power transmitting unit 103 and the target electronic device 115 periodically exchange information on the current status of the battery charge during the resonant battery charge operation at the next block 313.

When the battery is charged completely (fully charged) at block 315 the target electronic device 115 communicates this status so that the power transmitting unit 103 can disconnect the power transmission (magnetic coupling). At this point of time the power transmitting unit 103 has the details of the amount of power delivered to the target electronic device 115. This information is used for metering and subsequent billing. The resonant power charge operation ends at the next block 317.

Figure 4:
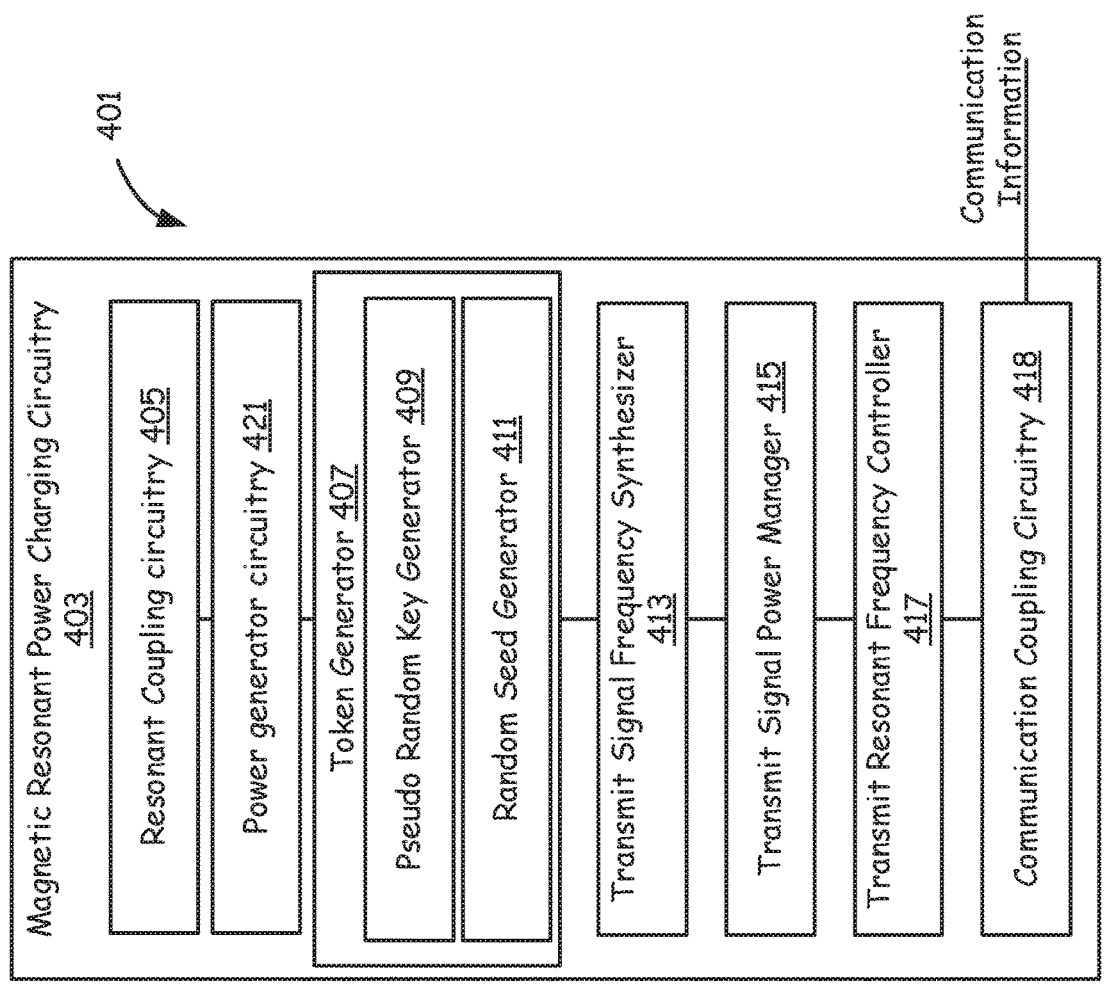
FIG. 4 is a block diagram illustrating the magnetic resonant power charging circuitry of FIG. 2 that is used to transmit power to multiple target devices located in a current direction of a non-radiated magnetic field.

FIG. 4 is a block diagram illustrating the magnetic resonant power charging circuitry 205 of FIG. 2 (401 of FIG. 4)

that is used to transmit power to multiple target devices located in a current direction of a non-radiated magnetic field/beam. Each of the target devices use randomly generated unique token for an authenticity check in accordance with one embodiment of the present invention. The magnetic resonant power charging circuitry 403, in addition to a resonant coupling circuitry 405 and a power generator circuitry 421, includes a token generator 407, a transmit signal frequency synthesizer 413, a transmit signal power manager 415, a transmit resonant frequency controller 417, and communication coupling circuitry 418.

If two or more target devices receive power on a same resonant frequency then the power source 203 has to manage the power delivery by generating a unique token for each of the target devices so as to track individual power consumption/delivery. The exchange of a token between the target device and the power source 203 authorizes that target device for receiving the power delivery on the same/common power resonant frequency. This technique helps when the multiple target devices are charging from a same/common magnetic resonant field/beam. During the resonant power delivery session the power source 203 and an individual target device, such as the magnetic resonant target device 211, synchronize token and related authentication information to authenticate a target device as a legitimate power receiver. This token based resonant power delivery can be used to serve all the target devices simultaneously.

During configuration of a target device for power delivery, a generated token is communicated to the target device 211 employing encryption for security, confidentiality and non-repudiation. The decryption of the generated token at the target device requires a key that is communicated out-of-band or generated using a key generation technique. For example, in one embodiment, the key is generated in the target device employing a seed provided for generating keys using a random seed generator 411, the same seed being used by the pseudo random key generator 409 to generate the key in the token generator 407.

The seed may be pre-configured in the target device or set initially by the user or the system. This key is thus generated in the target device or otherwise received as part of a configuration. In a related embodiment, a different key is generated for each communication/charging session using a seed provided to the target device. The key is generated in the target device randomly by using the seed sent by the random seed generator 411 of the magnetic resonant power charging circuitry 403.

The transmit signal frequency synthesizer 413 synthesizes stable reference frequency for magnetic coupling. In one embodiment, all other frequencies used for power delivery are a function of this stable frequency. The power level of the synthesized signal is managed by the transmit signal power manager 415 so as to adequate power level is delivered. It also manages power delivery in a particular pattern or beam form. The power level of the magnetic field which is resonant coupled with the target device 211, 115 is sensed and amplified to a power level that is adequate for transmission to a maximum range. This functionality of the power level management is provided by the transmit signal power manager 415.

The transmit resonant frequency controller 417 ensures that the magnetic power resonant field that charges the rechargeable battery of the target device 211, 115 is always stable. If for some reasons, the frequency drifts, then an automatic frequency controller mechanism is initiated to correct the magnetic coupling field frequency to its original predefined value.

Figure 5:
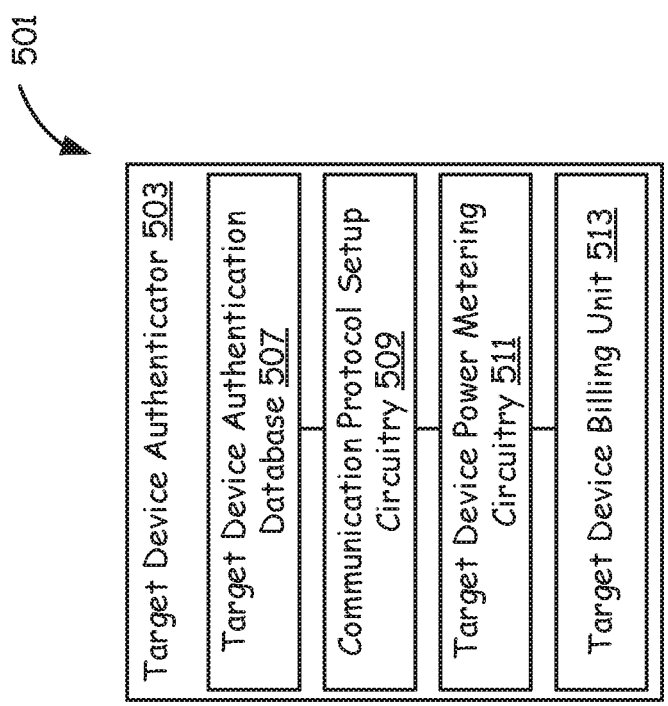
FIG. 5 is a block diagram illustrating a target device authenticator of FIG. 1 (and FIG. 2) which identifies and authenticates each target device using their respective unique identities during wireless resonant power charging operation in accordance with the present invention.

FIG. 5 is a block diagram 501 illustrating the target device authenticator of FIG. 1 (and FIG. 2) which identifies and authenticates each of target devices using their unique identity during wireless resonant power charging operation in accordance with the present invention. The target device authenticator 503 consists of a target device identification database 507, a communication protocol setup circuitry 509, a target device power metering circuitry 511 and a target device billing unit 513.

The target device identification database 507 consists of the information of all subscribers who have subscribed with the power source 203 of FIG. 2. Typically the database information contains a pre-assigned identification number of the target device, relevant personal details of the user, a preferred magnetic resonant frequency for the target device, etc. When the target device 211 communicates with the power source 203 during the power request it also sends it identity information so that the power source 203 cross-verifies with its target device identification database 507 contents. If the communicated information matches the database 507 contents then the resonant power delivery is initiated.

In one embodiment of the present invention the target device 211 tries to communicate with the power source 203 on its control channel 231 after setting up a communication protocol using the communication protocol setup circuitry 509. This circuitry sets up the target device 211 to communicate with the power source 203. This is required because, in general, the target device 211 performs some regular functionality other than charging, and in order to initiate the specific communication of the control operation for power transmission with the power source 203, it needs to be configured and it may require a protocol setup.

The target device power metering circuitry 511 records the resonant power delivered to the target device 115, 211. This module is also coordinated with the source power manager 107, 207 during the resonant source power delivery. It essentially monitors the total battery charging duration at a possible rate of power delivery. The target device billing unit 513 performs the billing functionality for the service provided by the power source 203 to the target device 115, 211.

Figure 6:
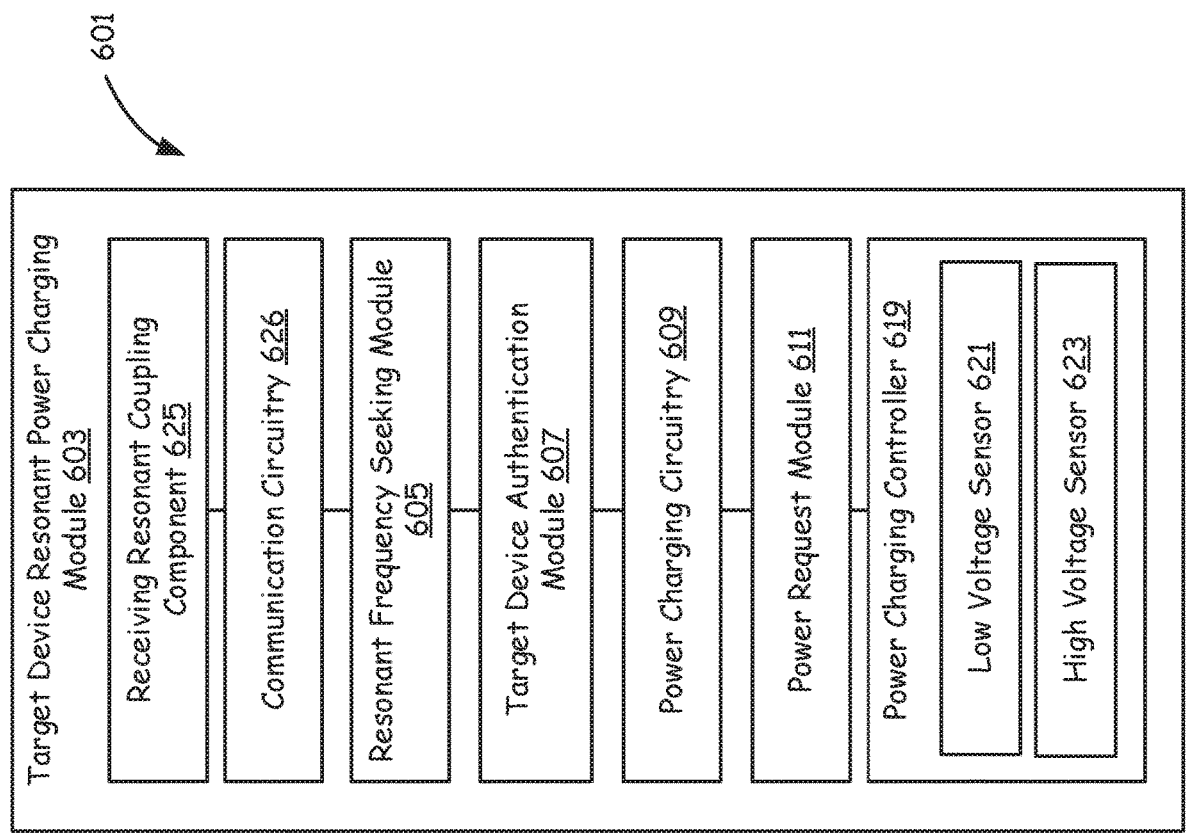
FIG. 6 is the block diagram illustrating a resonant power charging module of FIG. 1 that receives power on a single frequency on a wireless power and communication channel in accordance with one or more embodiments of the present invention.

FIG. 6 is a block diagram 601 illustrating a resonant power charging module 117 of FIG. 1 that receives power on a single frequency on a wireless power and communication channel 111 in accordance with one embodiment of the present invention. The target device resonant power charging module 603 consists of a receiving resonant coupling component 625, communication circuitry 626, a resonant frequency seeking module 605, a target device authentication module 607, a power charging circuitry 609, a power request module 611 and a power charging controller 619.

The receiving resonant coupling component 625 facilitates magnetic coupling, such as for non-radiated magnetic fields that are used for wireless power transmission. It has the antenna, tuning elements, etc. needed for coupling. The resonant frequency seeking module 605 tries to receive optimum incoming power signal by proper coupling by way of tuning the frequency of magnetic coupling. The maximization of the power signal reception is achieved by the automatic tuning of the resonant coupling circuit component, so that the tuning matches with the incoming magnetic field power frequency. Also, the quality factor of the tuning elements is maximized by appropriately biasing the active devices to the low resistive region of operation.

The target device authentication module 607 communicates with the power transmitting unit 103 or the power source 203 periodically to authenticate itself with it. The target device authenticator 109 of FIG. 1 and the target device authentication module 607 coordinate with each other in the process of resonant power transfer. The target device authenticator 109 identifies the target device by comparing the identity data received with the subscription data stored in the database 507 of FIG. 5.

The power charging circuitry 609 is the actual power signal charging circuitry that can charge a rechargeable battery or provide power for the operation of the target device. It provides DC rectifier diodes, capacitor array, battery charge control circuitry, voltage sensor circuitry, and the voltage regulation circuitry, as needed.

The receiving resonant coupling component 625 (such as an antenna or coil) is part of the power charging circuitry 609, in one embodiment of the present invention. Automatic tuning is achieved, such as using the varactor diode by controlling its bias voltage appropriately which works as a variable capacitor. If the rectifier/voltage multiplier circuit is not a part of the receiving resonant coupling component 625, then isolation between the resonant circuit and diode/capacitor voltage multiplier circuit is required for a sharp tuning with the incoming power signal, which is provided by the power charging circuitry 609.

A power request module 611 is coordinated by the voltage sensing circuitry. When the voltage falls below a preset value the power request module 611 communicates with the power source 203, or the nearest power transmitting unit to the current location of target device. Subsequent to the power request made by the power request module 611 the resonant power delivery starts.

The power charging controller 619 helps in maintaining the rechargeable battery charge at a safer limit for a smooth functioning of the target device 115, 211. The power charging controller 619 has a low voltage sensor 621 and a high voltage sensor 623. The low voltage sensor 621 monitor the low voltage limit of the rechargeable battery and the high voltage sensor 623 monitor the high voltage limit.

Figure 7:
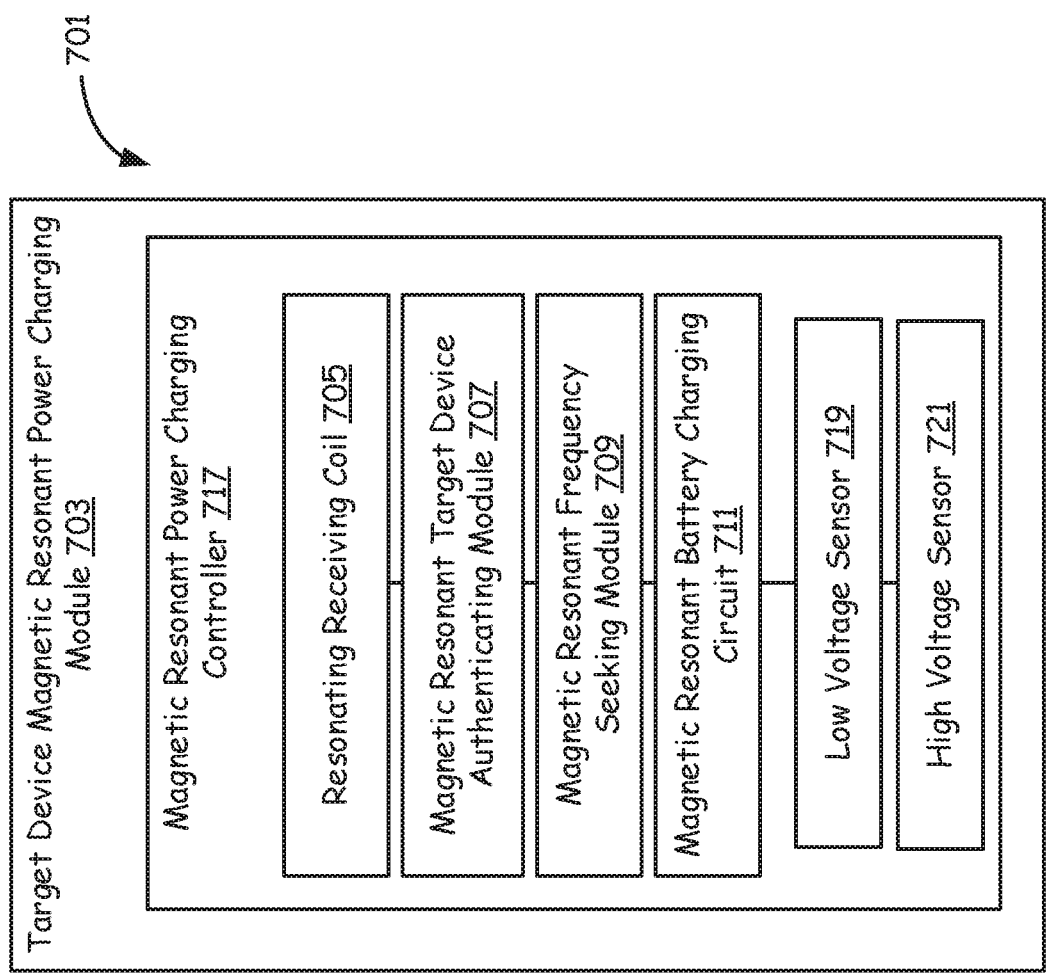
FIG. 7 is the block diagram illustrating a target device magnetic resonant power charging module according to embodiments of the present invention.

FIG. 7 is a block diagram 701 illustrating a target device magnetic resonant power charging module 703 used in a target device. It is used which in target devices to receive power through high frequency magnetic flux coupling resulting from the resonant magnetic fields of a particular frequency provided by a power source, in accordance with the present invention. The target device's magnetic resonant power charging module 703 consists of a magnetic resonant power charging controller circuitry 717 that includes a resonating receiving coil 705, a magnetic resonant target device authentication module 707, a magnetic resonant frequency seeking module 709, a magnetic resonant battery charging circuit 711, a low voltage sensor 719, and a high voltage sensor 721.

The resonating receiving coil 705 is the coil on the magnetic resonant target device 211, capable of coupling with high frequency magnetic flux fields 225-229 of FIG. 2. The magnetic flux induces a voltage across the resonating receiving coil 705. The voltage across the resonating receiving coil 705 is maximized by a tuning mechanism which includes this coil as part of it, in accordance with one embodiment of the present invention. This tuning circuit has rectifier diodes for rectifying the magnetically induced AC voltage across the tuning circuit along with a variable capacitor (varactor diode). The rectified voltage in the form of DC is stored in an array of capacitors acting as voltage multiplier. The voltage from the voltage multiplier will charge the rechargeable battery 233 of FIG. 2.

The magnetic resonant target device authenticating module 707 sends the authentication information from the magnetic resonant target device 211 to the power source 203 of FIG. 2 during resonant power request. The target device authenticator 209 of FIG. 2 receives this information and authenticates the magnetic resonant target device 211 for the subsequent power delivery. The magnetic resonant frequency seeking module 709 has the functionality of maximizing the received power on the magnetic resonant target device 211 of FIG. 2 by automatic fine tuning of the resonating components.

Figure 8:
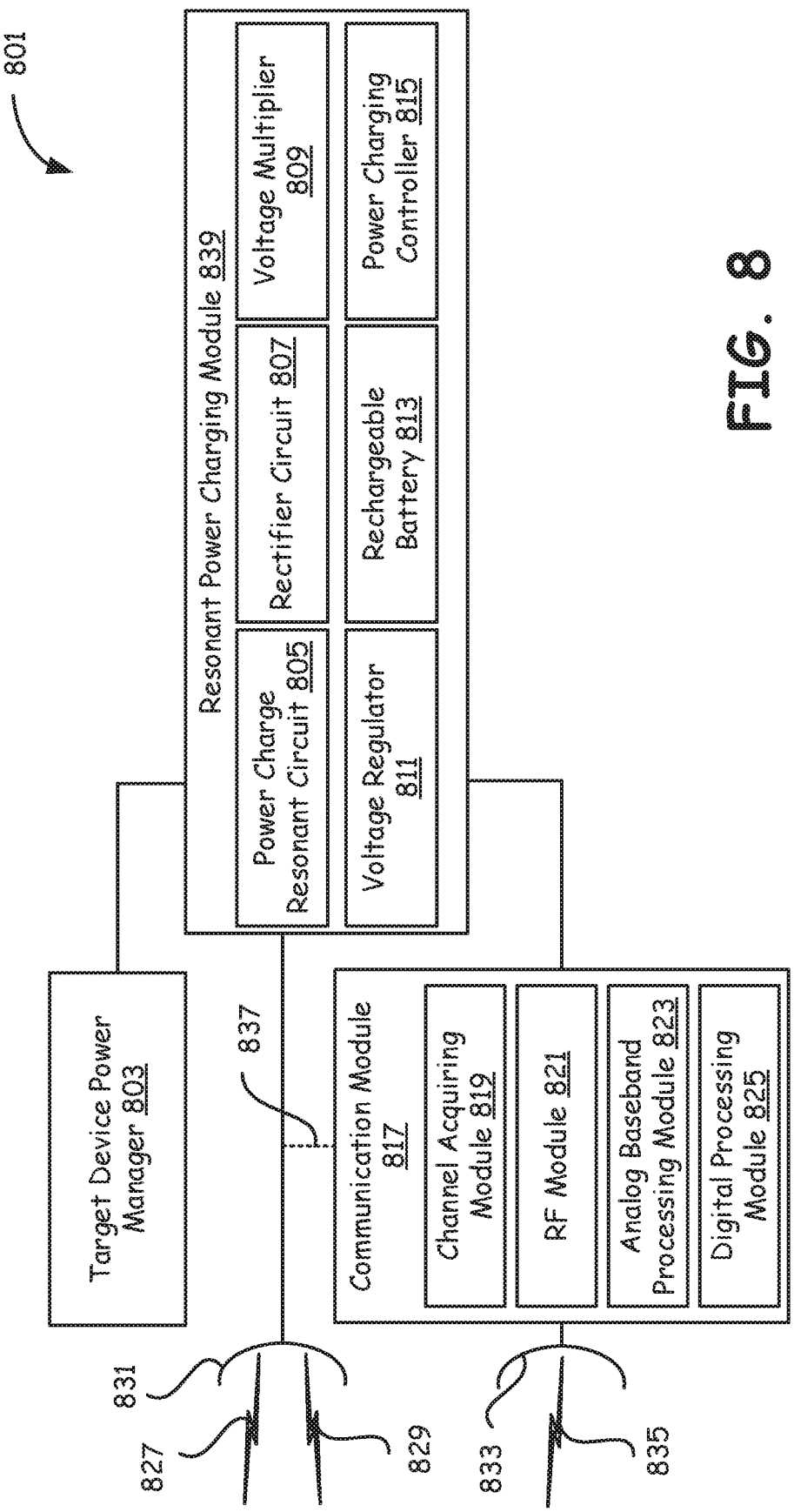
FIG. 8 is a block diagram illustrating an embodiment of a target electronic device of FIG. 1 receiving a power signal using a resonant power charging module.

FIG. 8 is a block diagram 801 illustrating an embodiment of a target electronic device 115 of FIG. 1 receiving the power signal using the resonant power charging module 117. The communication module 125 of FIG. 1 consumes power from the rechargeable battery 129 of FIG. 1, while the target device power manager 127 simultaneously coordinates the operation of resonant power charging of the rechargeable battery 129, in accordance with one aspect of the present invention. An exemplary electronic device considered as the target device in FIG. 8 consists of a target device power manager 803, a resonant power charging module 839, and the communication module 817.

The exemplary resonant power charging module 839 includes a power charge resonant circuit 805, a rectifier circuit 807, a voltage multiplier 809, a voltage regulator 811, a rechargeable battery 813 (129 of FIG. 1 repeated), and a power charging controller 815 (119 of FIG. 1 repeated). The power charge resonant circuit 805 is a tuned circuit that resonates with the incoming power signal. With the quality factor of the power charge resonant circuit 805 being quite large voltage builds up across it. The rectifier circuit 807 is made up of special diodes which rectifies the incoming RF signal and charges the capacitor array of the voltage multiplier 809.

When the voltage across the voltage multiplier 809 increases to a threshold level, the rechargeable battery 813 starts charging. The power charging controller 815 monitors the battery voltage. When once the battery voltage level reaches its full charge limit the power charging controller 815 issues a signal to set high voltage limit flag monitored by the target device power manager 803 (127 of FIG. 1 repeated). Similarly when the voltage level falls below a preset low level the power charging controller 815 issues a signal that sets a low voltage limit flag monitored/read by 'target device power manager' 803.

Upon reading the high voltage limit flag the target device power manager 803 sends a power cutoff request to the power transmitting unit 103 on the control channel 113. By reading the low voltage limit flag the target device power manager 803 sends a power request to the power transmitting unit 103. Further the target device power manager 803 monitors the rechargeable battery voltage during the power delivery to communication module 817 for its normal operation. The power charging controller 815 senses the low voltage limit and sets the low voltage limit flag. The target device power manager 803 reads the low voltage limit flag and request with power transmitting unit 103 of FIG. 1 for the delivery of the resonant power signal. The target device power manager 803 tries to maintain the constant supply voltage by controlling the duty cycle of the DC to DC converter based voltage regulator 811.

The communication module 817 is powered by the rechargeable battery 813. In one embodiment of the present invention the antenna 831 is used for both resonant power charging 827 and normal communication operation 829. When used this way the dotted wired link 837 is used for the communication signal. When the battery is charging with the resonant power signal the communication circuit needs to be protected or cutoff from the resonant power signal. This configuration will disturb the resonant tuning of target device by lowering the quality factor of the tuned circuit.

In another embodiment of the present invention instead of the wired link 837 (dotted line) connection another antenna 833 with the wireless link 835 is employed exclusively for communication purposes.

The sub-modules of the communication module 817 are the channel acquiring module 819, an RF communication module 821, an analog baseband processing module 823, and the digital processing module 825. The channel acquiring module 819 facilitates the function of acquiring different communication channel as in a mobile phone. The RF communication module 821 performs the function of modulation, demodulation, amplification of RF signal, etc. The analog baseband processing module 823 processes the baseband signal. The digital processing module 825 performs the digital signal processing functionality, which includes encryption/decryption of the digital data, etc.

Figure 9:
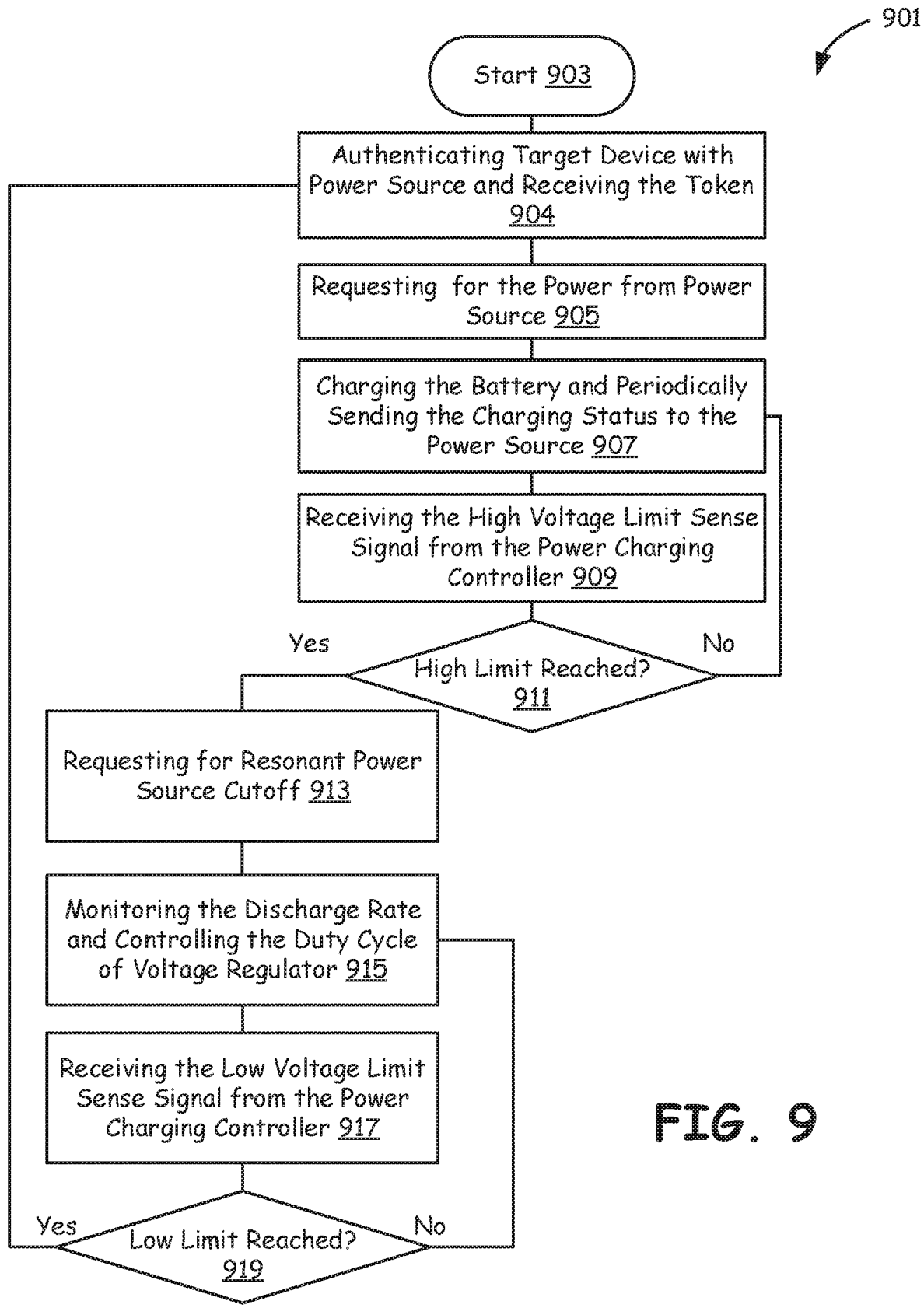
FIG. 9 is a flowchart illustrating actions performed by a target device power manager of FIG. 1 and FIG. 2 during the resonant power charging operations, in accordance with one or more embodiments of the present invention.

FIG. 9 is a flowchart 901 illustrating actions performed by the target device power manager of FIG. 1 and FIG. 2 during the resonant power charging operation, in accordance with the present invention. The target device power manager 127 of FIG. 1 starts operations at a start block 903. Then, at a next block 904, it authenticates with the power transmitting unit 103 of FIG. 1 for its subscription. When the subscription of the target electronic device 115 of FIG. 1 is authenticated the target device power manager 127 of FIG. 1 sends the power charging request for the power transmitting unit 103 of FIG. 1 at a subsequent block 905.

In response to this the power transmitting unit 103 of FIG. 1 transmits the power charging signal to the target electronic device 115. The target device power manager 127 of FIG. 1 then monitors the charging status and updates it to the power transmitting unit 103 at a next block 907.

Then, at a next block 909, the target device power manager 127 of FIG. 1 monitors the high voltage limit corresponding to the full battery charge condition and sets the high voltage flag. The target device power manager 127 then tests the high voltage flag at a next decision block 911. If the test returns false then the target device power manager 127 continues the battery charging operation by going back to the next block 907.

If the test returns true at the decision block 911, the target device power manager 127 of FIG. 1 communicates a request for the resonant power cutoff at a next block 913. It then continues monitoring the discharge rate of the battery and adjusts the duty cycle of the voltage regulator 811 of FIG. 8 at a next block 915. It continues sensing the low voltage limit periodically at a next block 917. The target device power manager then reads the low voltage limit flag and tests the low voltage limit flag at a next block 919. If the test returns false the target device power manager 127 performs the battery voltage monitoring operation at a next block 915, else it goes back to the next block 904 for authentication and subsequent resonant power charging.

Figure 10:
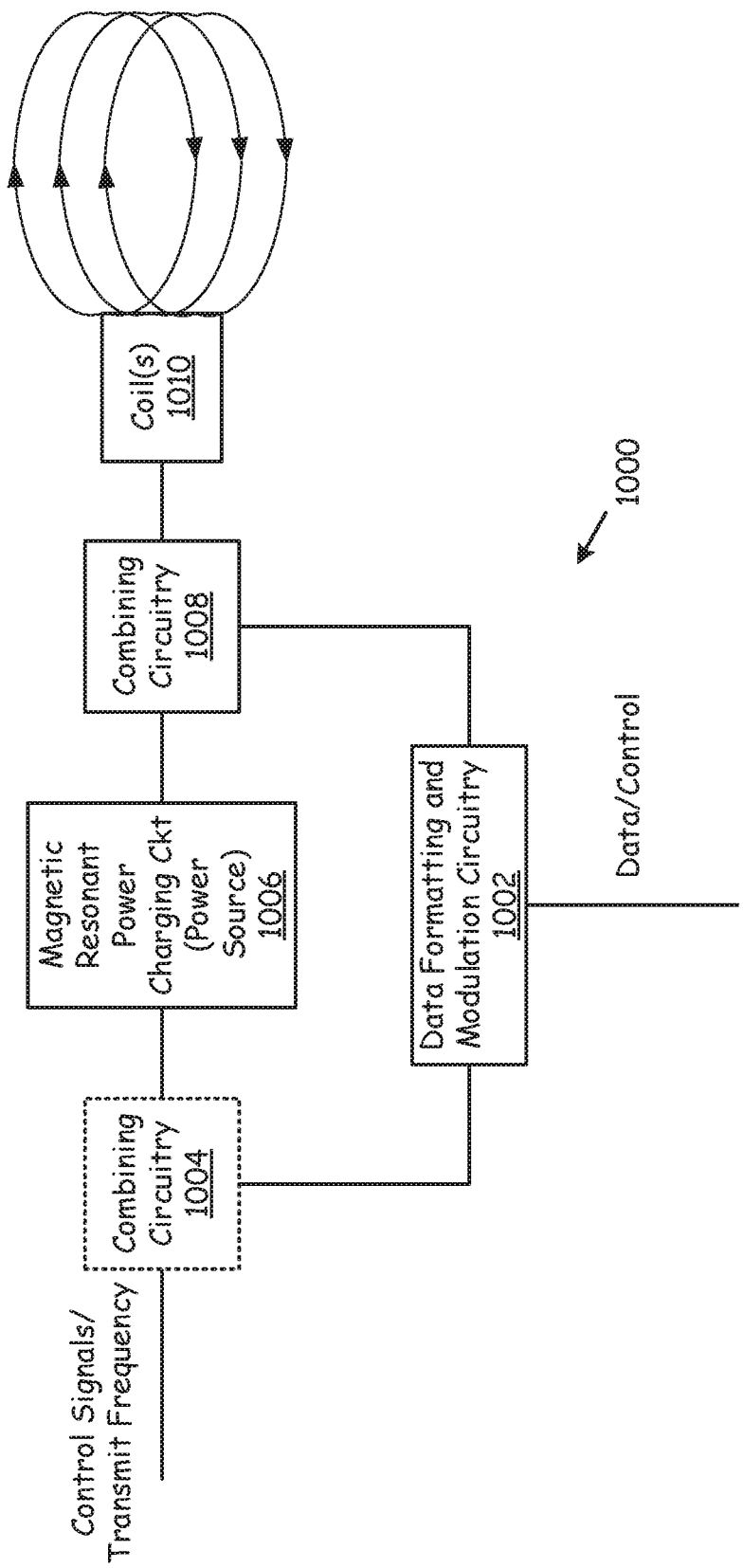
FIG. 10 is a block diagram illustrating structure for communication coupling in a power transmitting unit.

FIG. 10 is a block diagram illustrating structure 1000 for communication coupling in a power transmitting unit. The structure includes data formatting and modulation circuitry 1002, and one or more of combining circuitry 1004 and 1008. The data formatting and modulating circuitry receives data and control information, formats such information, and modulates the information into an analog information signal in a selected spectrum. This spectrum may be centered at the target resonant frequency or at another frequency. The analog information signal is coupled to the power signal of the target resonant frequency for transmission to via coil(s) 1010. Depending upon the embodiment it may be preferable to couple the analog information signal prior to or subsequent to the magnetic resonant power charging circuit 1006. For example, if the signal incoming to the combining circuitry 1004 is of a selected target resonant frequency but at a low amplitude it may be preferable to couple the analog information signal by combining circuitry 1004. However, if the magnetic resonant power charging circuit may degrade the analog information signal after coupling, it may be desirable to couple the analog information signal via combining circuitry 1008.

Figure 11:
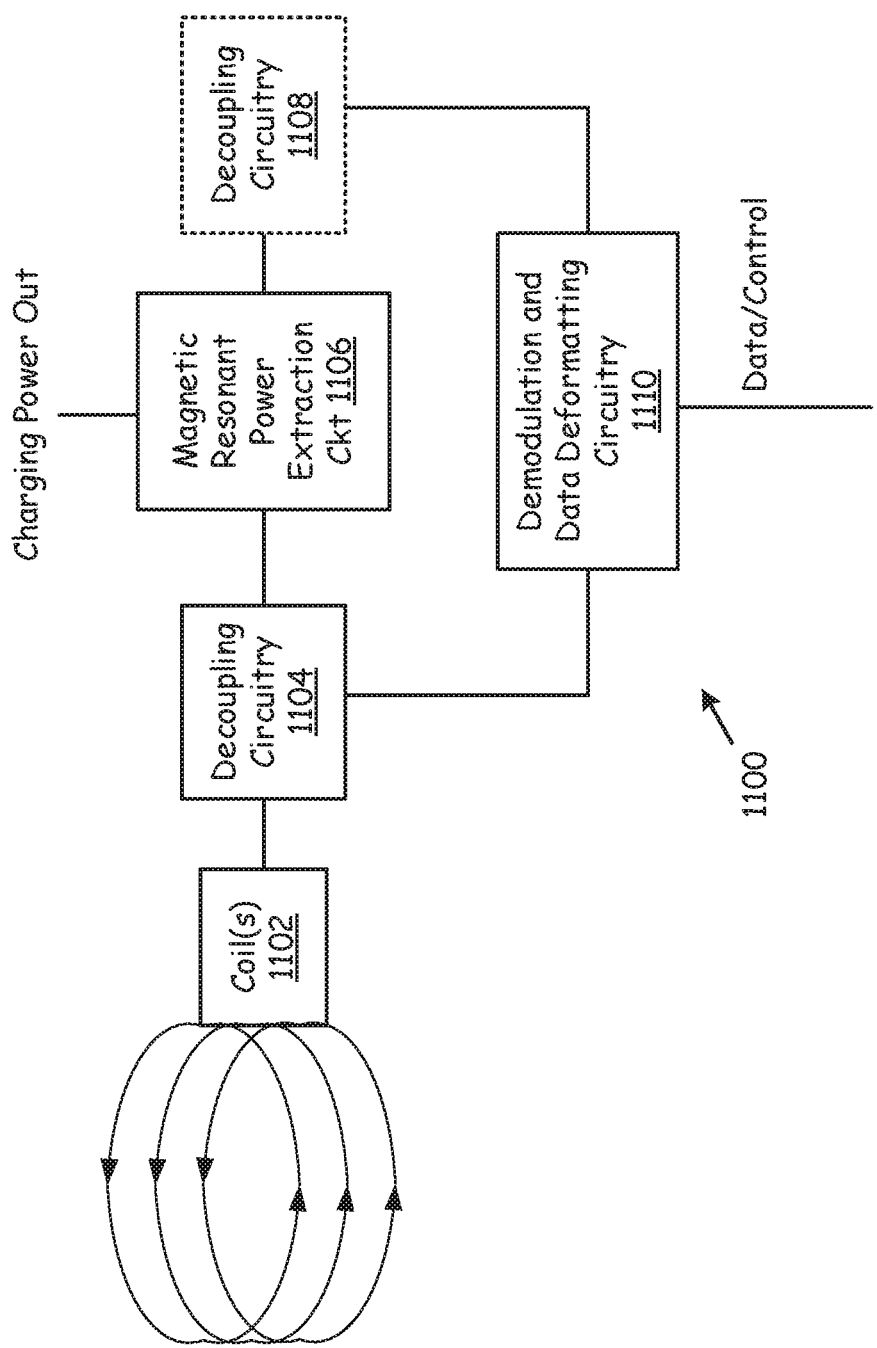
FIG. 11 is a block diagram illustrating structure for communication de-coupling in a target device.

FIG. 11 is a block diagram illustrating structure 1100 for communication de-coupling in a target device. Note that the structure 1100 of FIG. 11 could also be included in the power transmitting unit as well. The structure 1100 of FIG. 11 includes coils 1102, decoupling circuitry 1104 and/or 1108, magnetic resonant power extraction circuit 1106 and demodulation and data de-formatting circuitry 1110. Note that the decoupling circuitry 1104 and/or 1108 may decouple an analog information signal from the signal received by the coil(s) 1102 before or after the magnetic resonant power extraction circuit 1106. The demodulation and de-formatting circuitry operates to extract data and control information from a received analog information signal and may include down conversion, filtering, amplification, demodulation, decoding, and various other functional structures.

The terms "circuit" and "circuitry" as used herein may refer to an independent circuit or to a portion of a multi-functional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A wireless powering device for providing wireless power to target devices, the wireless powering device comprising:
   a power source;
   communication circuitry configured to receive a communication signal from a target device, the communication signal comprising target device authentication information previously provided to the target device; and
   resonant coupling circuitry coupled to the power source, the resonant coupling circuitry configured to:
   generate a wireless power transmission to transfer wireless power to the target device responsive to authentication of the target device authentication information and responsive to retrieval of a target resonant frequency for the target device using the target device authentication information; and
   dynamically adjust the target resonant frequency of the wireless power transmission based on feedback received from the target device via the communication circuitry.

2. The wireless powering device of claim 1, wherein the wireless power transmission by the resonant coupling circuitry is via a non-radiated magnetic field.

3. The wireless powering device of claim 2, wherein generating the wireless power transmission includes directional adjustments of the non-radiated magnetic field in a direction of a location of the target device.

4. The wireless powering device of claim 1, wherein the wireless power transmission by the resonant coupling circuitry is via a radiated magnetic field.

5. The wireless powering device of claim 4, wherein generating the wireless power transmission includes focusing magnetic flux lines in a direction of a location of the target device.

6. The wireless powering device of claim 1, wherein the resonant coupling circuitry includes a directional antenna for providing the wireless power transmission.

7. The wireless powering device of claim 1, wherein the resonant coupling circuitry includes at least one of an antenna array or a dish antenna for providing the wireless power transmission.

8. The wireless powering device of claim 1, further comprising source power manager circuitry configured to determine a location of the target device relative to the wireless powering device based, at least in part, on an arrival direction of the target device as indicated by the communication signal.

9. The wireless powering device of claim 8, wherein:
   the communication circuitry is further configured to receive a plurality of communication signals from a plurality of target devices;
   the source power manager circuitry is further configured to determine, based on the plurality of communication signals, respective locations of the plurality of target devices relative to the wireless powering device; and
   the resonant coupling circuitry is further configured to generate the wireless power transmission based on the respective locations of the plurality of target devices.

10. The wireless powering device of claim 1, wherein the wireless powering device further comprises:
    a target device authenticator coupled to the communication circuitry, the target device authenticator configured to determine, based on the target device authentication information, the target resonant frequency to be used for the wireless power transmission.

11. A wireless powering device for providing wireless power to a target device, the wireless powering device comprising:
    an integrated circuit formed including communication circuitry and source power manager circuitry, the integrated circuit coupled to resonant coupling circuitry, wherein the integrated circuit is configured to:
    receive a communication signal from the target device, the communication signal comprising target device authentication information previously provided to the target device;

control the resonant coupling circuitry to generate a wireless power transmission to transfer wireless power to the target device responsive to authentication of the target device authentication information and responsive to retrieval of a target resonant frequency for the target device using the target device authentication information; and dynamically adjust the target resonant frequency of the wireless power transmission based on feedback received from the target device via the communication circuitry.

12. The wireless powering device of claim 11, wherein the resonant coupling circuitry is further formed as part of the integrated circuit.

13. The wireless powering device of claim 11, wherein the wireless power transmission by the resonant coupling circuitry is via a non-radiated magnetic field.

14. The wireless powering device of claim 13, wherein generating the wireless power transmission includes directional adjustments of the non-radiated magnetic field in a direction of a location of the target device.

15. The wireless powering device of claim 11, wherein the wireless power transmission by the resonant coupling circuitry is via a radiated magnetic field.

16. The wireless powering device of claim 15, wherein generating the wireless power transmission includes focusing magnetic flux lines in a direction of a location of the target device.

17. A method for execution by a wireless powering device to provide wireless power for a target device, the method comprising:

receiving a communication signal from the target device, the communication signal comprising target device authentication information previously provided to the target device;

generating, responsive to authentication of the target device authentication information and responsive to retrieval of a target resonant frequency for the target device using the target device authentication information, a wireless power transmission to transfer wireless power to the target device, wherein the wireless power transmission is via a non-radiated magnetic field generated by resonant coupling circuitry; and dynamically adjusting the target resonant frequency of the wireless power transmission based on feedback received from the target device.

18. The method of claim 17, wherein generating the wireless power transmission includes directional adjustments of the non-radiated magnetic field in a direction of a location of the target device.

19. The method of claim 17, wherein determining a relative location of the target device is based, at least in part, on an arrival direction of the target device as indicated by the communication signal.

20. The method of claim 17, wherein the communication signal identifies the target resonant frequency to be used for the wireless power transmission.

* * * * *